(12) United States Patent
Jain et al.

(10) Patent No.: US 7,684,797 B2
(45) Date of Patent: Mar. 23, 2010

(54) ACCESSING TELECOMMUNICATION DEVICES USING MOBILE TELEPHONE NUMBERS

(75) Inventors: Nikhil Jain, Mendham, NJ (US); Paul E. Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 11/343,381

(22) Filed: Jan. 30, 2006

(65) Prior Publication Data

US 2007/0093244 A1 Apr. 26, 2007

Related U.S. Application Data

(60) Provisional application No. 60/730,244, filed on Oct. 25, 2005.

(51) Int. Cl.
*H04W 4/00* (2009.01)
(52) U.S. Cl. ........................................ 455/433; 455/466
(58) Field of Classification Search .............. 455/435.1, 455/466, 412.1, 426.1, 552.1, 435.2, 435.3, 455/422.1; 370/328, 352, 254, 447
See application file for complete search history.

(56) References Cited

U.S. PATENT DOCUMENTS

| | | | | |
|---|---|---|---|---|
| 2002/0099799 A1* | 7/2002 | Kolsky | ........................ | 709/219 |
| 2003/0054810 A1* | 3/2003 | Chen et al. | .................. | 455/422 |
| 2004/0224668 A1* | 11/2004 | Shell et al. | ............... | 455/412.1 |
| 2005/0018654 A1 | 1/2005 | Smith et al. | | |

FOREIGN PATENT DOCUMENTS

| EP | 0608613 A1 | 3/1994 |
|---|---|---|
| EP | 1017210 A1 | 5/2000 |

OTHER PUBLICATIONS

International Search Report—PCT/US06/060245—International Search Authority, European Patent Office—Aug. 16, 2007.
Written Opinion—PCT/US06/060245—International Search Authority, European Patent Office—Aug. 16, 2007.
International Preliminary Report on Patentability—PCT/US06/060245—The International Bureau of WIPO, Geneva, Switzerland—Apr. 29, 2008.

* cited by examiner

*Primary Examiner*—Melody Mehrpour
(74) *Attorney, Agent, or Firm*—Dang M. Vo (57) ABSTRACT

A telecommunications system includes an infosphere having a mobile telephone. A first telecommunications device may request to be added to the infosphere by sending a request to a registry server. In response to the request, the registry server adds the first telecommunications device to the infosphere by creating a network address for the first telecommunications device, the network address being related to the telephone number of the mobile telephone. In some embodiments of the telecommunications system, the registry server may require authorization from a second telecommunications device in the infosphere before adding the first telecommunications device to the infosphere.

37 Claims, 8 Drawing Sheets

ACCESSING TELECOMMUNICATION DEVICES USING MOBILE TELEPHONE NUMBERS

CLAIM OF PRIORITY UNDER 35 U.S.C. §119

The present Application for Patent claims priority to Provisional Application No. 60/730,244 entitled "MOBILE PHONE NUMBER ADDRESSING OF NETWORK NODES" filed Oct. 25, 2005, and assigned to the assignee hereof and hereby expressly incorporated by reference herein.

BACKGROUND

1. Field

The present disclosure relates generally to telecommunications, and more particularly, to systems and techniques that allow a user on one telecommunications device to access another telecommunications device.

2. Background

Recent advances in technology has drastically increased the commercialization of consumer telecommunication devices. Today, most consumers of telecommunication products own, in addition to a mobile telephone, a plethora of Internet devices. These Internet devices may include, by way of example, a personal and laptop computer, a personal digital assistant (PDA), a telephony device, a game console, a digital camera, and media devices, just to name a few. As consumers begin to rely more and more on these telecommunication devices to support their daily activities, it becomes increasingly more important to provide users with a simple, convenient and efficient means to access these devices.

Currently, a new generation of mobile telephones exist that provide Internet access. A user simply launches a program that connects the mobile telephone to the Internet and then enters the Internet protocol (IP) address of the Internet device that the user seeks to access. This approach, however, is not limited to mobile telephones. A user on an Internet device, such as a computer, may access any one of his Internet devices using the same approach. In theory, this approach works well. However, as the number of Internet devices that a user needs to access expands, it becomes increasingly more difficult for a user to remember the IP address for each device. Moreover, many Internet devices do not have a permanent IP address, but rather a dynamic IP address that changes with each new Internet session. Accordingly, there is a need in the art for a more efficient methodology for accessing the various Internet devices of a user.

SUMMARY

Various concepts will be described that address this need. These concepts are based on an addressing scheme that associates the Internet devices of a user with his or her mobile telephone number.

In one aspect of the present invention, a registry server includes a processor configured to receive a request from a telecommunications device to add the telecommunications device to an infosphere having a mobile telephone, and in response to the request, add the telecommunications device to the infosphere by creating a network address for the telecommunications device, the network address being related to the telephone number of the mobile telephone.

In another aspect of the present invention, a telecommunications device includes a processor configured to communicate with a registry server to add the telecommunications device to an infosphere having a mobile telephone by providing to the registry server the telephone number of the mobile telephone.

In yet another aspect of the present invention, a telecommunications device is configured to remotely control an infosphere having a mobile telephone. The telecommunications device includes a processor configured to receive a request from a registry server to add a second telecommunications device to the infosphere, and provide to the registry server a message either authorizing or rejecting the request.

In a further aspect of the present invention, a method of maintaining an infosphere having a mobile telephone includes receiving, at a registry server, a request from a telecommunications device to add the telecommunications device to the infosphere, and adding, in response to the request, the telecommunications device to the infosphere by creating, at the registry server, a network address for the telecommunications device, the network address being related to the telephone number of the mobile telephone.

In yet a further aspect of the present invention, computer readable storage medium containing a set of instructions for a processor includes a routine configured to receive, at a registry server, a request from a telecommunications device to add the telecommunications device to an infosphere having a mobile telephone, and a routine configured to add, in response to the request, the telecommunications device to the infosphere by creating, at the registry server, a network address for the telecommunications device, the network address being related to the telephone number of the mobile telephone.

In another aspect of the present invention, a registry server includes means for receiving a request from a telecommunications device to add the telecommunications device to an infosphere having a mobile telephone, and means for adding the telecommunications device to the infosphere, in response to the request, by creating a network address for the telecommunications device, the network address being related to the telephone number of the mobile telephone.

In yet another aspect of the present invention, a telecommunications device includes means for providing to the registry server the telephone number of a mobile telephone; and means for communicating with a registry server to add the telecommunications device to an infosphere having the mobile telephone.

In a further aspect of the present invention, a telecommunications device configured to remotely control an infosphere having a mobile telephone includes means for receiving a request from a registry server to add a second telecommunications device to the infosphere, and means for providing to the registry server a message either authorizing or rejecting the request.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
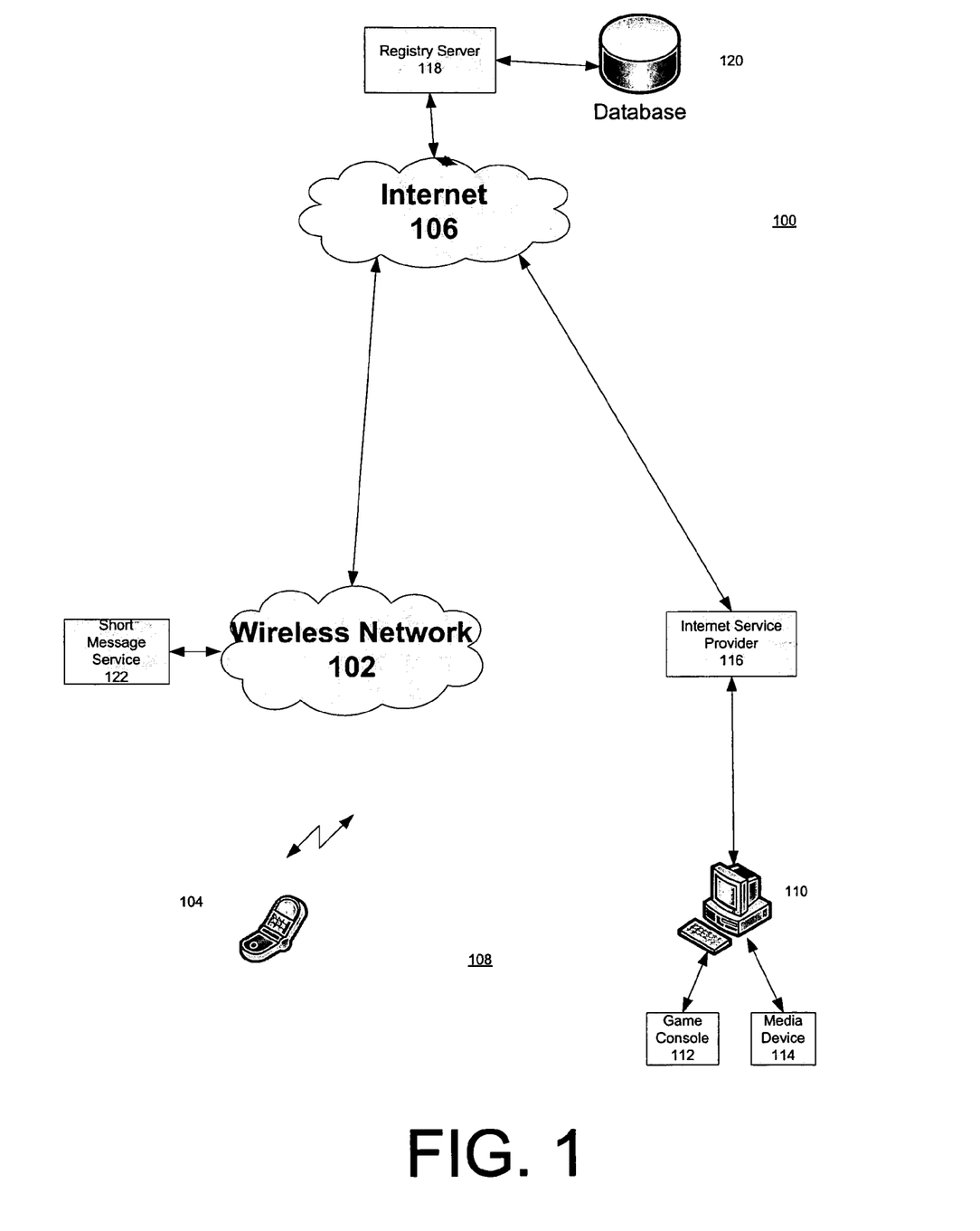
FIG. 1 is a conceptual diagram of a telecommunications system supporting a user's infosphere.

FIG. 1 is a conceptual block diagram illustrating an example of a telecommunications system. The telecommunications system 100 includes a wireless network 102 which connects any number of mobile devices to various packet-based and/or circuit-switched networks. The wireless network 102 may be a Code Division Multiple Access (CDMA) network that supports wireless voice and data services using spread-spectrum processing. Alternatively, the wireless network 102 may be a Global System for Mobile Communications (GSM) network, a General Packet Radio Service (GPRS) network, a Universal Mobile Telecommunications System (UMTS) network, or any other suitable wireless network. Those skilled in the art will be readily able to determine the particular wireless network best suited for any particular application based on the system parameters and the overall design constraints imposed on the wireless network 102.

The wireless network 102 is shown in FIG. 1 as a means by which a mobile telephone 104 connects to the Internet 106. In this embodiment, the mobile telephone 104 may communicate over the Internet 106 with any Internet device in the user's infosphere 108. The term "infosphere" refers to a collection of wired and/or wireless devices that share a common addressing scheme based on the user's mobile telephone number. The user's infosphere 108 shown in FIG. 1 includes the mobile telephone 104, a computer 110, a game console 112, and a media device 114 such as an MP3 player or the like.

The computer 110 may be connected to the Internet 106 through an Internet Service Provider (ISP) 116. A standard twisted pair telephone line, a digital subscriber line (DSL), a cable modem, or any other suitable medium may be used to support communications between the computer 110 and the ISP 116. Alternatively, the computer 110 may have a wireless connection to the Internet 106, either through the wireless network 102 shown in FIG. 1, or some other wireless medium such as a wireless Local Area Network (LAN) implemented with 802.11, Bluetooth, Home RF, Ultra-Wideband (UWB), or any other suitable technology.

The game console 112 and the media device 114 may be connected to the computer 110 as shown in FIG. 1. Alternatively, the game console 112 and/or the media device 114 may be capable of establishing their own Internet connection directly through the ISP 116. In another embodiment, the game console 112 and/or the media device may have a wireless connection to the Internet 106 through the wireless network 102 or by some other suitable means. In the case of a wireless connection, the game console 112 and/or media device 114 may be equipped with a wireless transceiver, or alternatively, may use an external wireless modem (not shown) to support the Internet connection.

The computer 110, game console 112, and the media device 114, as well as other wired and wireless devices, may be added or deleted from the user's infosphere 108 using the mobile telephone 104 or some other telecommunications device. As an illustrative example, the process of adding the computer 110 to the user's infosphere 108 will be described. In this example, the process may be performed with a software application running on a microprocessor in the computer 110, or by some other software, firmware, and/or hardware configuration. In the microprocessor based architecture, the user launches the application (or performs some other enabling function), to initiate the process. The user then enters his or her mobile telephone number into the computer 110, along with a request to add the computer 110 to the user's infosphere. At the same time, or thereabouts, the computer 110 establishes a network connection with an Interworking Function (IWF) (not shown) in the ISP 116. If the computer 110 does not have a permanent IP address, the ISP 116 assigns a temporary IP address to the computer 110. The computer 110 uses the IP address to send information to a registry server 118 over the Internet 106. The information includes the IP address for the computer 110, the user's mobile telephone number, and the request to add the computer 110 to the user's infosphere 108.

The registry server 118 may provide a variety of functions including authorizing the request to add the computer 110 to the user's infosphere, creating a network address for the computer 110 based on the user's mobile telephone number, mapping the computer's network address to the computer's IP address, and storing the result in a database 120. In at least one embodiment of the registry server 118, the computer's network address comprises the user's mobile telephone number with a suffix that identifies the type of device that is being added to the user's infosphere 108. By way of example, a suffix of ".pc" may be added to a user's mobile telephone number "555-1234" to indicate that the device being added to the user's infosphere 108 is a computer. In this case, the registry server 118 maps the IP address of the computer 110 to "5551234.pc."

The authorization function of the registry server 118 may be implemented using the mobile telephone 104, or some other Internet device that already belongs to the user's infosphere 108. In the embodiment of the telecommunications system 100 shown in FIG. 1, the registry server 118 obtains authorization for the request through the mobile telephone 104 using a Short Message Service (SMS) feature in the wireless network 102. The SMS 122 is an entity which exchanges short messages with any number of mobile devices connected to the wireless network 102. Using this approach, the registry server 118 prompts the SMS 122 to send a message over the wireless network 102 to the mobile telephone 104 requesting authorization to add the computer 110 to the user's infosphere 108. A response to the authorization request is sent by the user on the mobile telephone 104 to the SMS 122. The registry server 118 queries the SMS 122 to determine whether the request to add the computer 110 to the user's infosphere has been authorized. Assuming that the user has authorized the request, the registry server 118 adds the computer 110 to the user's infosphere by creating a network address for the computer 110 and mapping the network address to the computer's IP address.

A similar process may be performed to delete the computer 110 from the user's infosphere 108. More specifically, the computer 110 can be deleted from the user's infosphere by launching a software application (or by some other enabling means), entering the user's mobile telephone number, and requesting that the computer 110 be deleted from the user's infosphere 108. The computer 110 then connects to the Internet through the ISP 116, and sends its IP address, along with the request, to the registry server 118. The registry server 118 uses the SMS 122 to obtain authorization from the mobile telephone 104 to delete the computer 110 from the user's infosphere 108. Once authorization is received by the registry server 118, the computer's IP address is deleted from the database 120.

The game console 112 and/or the media device 114 can also added to or deleted from the user's infosphere 108. The procedure is similar to that described above in connection with the computer 110. That is, the user launches a software application (or performs some other enabling function), enters his or her mobile telephone number, and requests that the game console 112 and/or media device 114 be either added to or deleted from his or her infosphere 108. The computer 110 then connects to the Internet 106 through the ISP 116, and sends the computer's IP address, along with the request to the registry server 118. Using the SMS 122, the registry server 118 obtains authorization from the user on the mobile telephone 104 and completes the transaction. In the case of a request to add the game console 112 and/or the media device 114 to the user's infosphere 108, the registry server 118 creates an network address for the game console 112 and/or media device 114, and maps the network address to the IP address of the computer 110 (the network node for the game console 112 and/or media device 114). In this example, the game console's network address is "555-1234.gc" and the media device's network address is "555-1234.md." In the case of a request to delete the game console 112 and/or media device 114 from the user's infosphere 108, the registry server 118 deletes from its database 120 the network address for the game console 112 and/or media device 114.

A user may access an Internet device in his or her infosphere 108 through another Internet device. In FIG. 1, a mobile telephone 104 is used to access the Internet devices in the user's infosphere 108, but the concepts described in this disclosure are in no way limited to this implementation. A user may access the Internet devices in his or her infosphere by launching a software application (or by performing some other enabling function), and entering the network address for the target device. By way of example, the user may access the computer 110 by entering "555-1234.pc" into the mobile telephone 104. The mobile telephone 104 then establishes an Internet connection over the wireless network 102 and sends the network address to the registry server 118. The registry server 118 accesses its database 120 to retrieve the corresponding IP address and sends that IP address back to the mobile telephone 104. The mobile telephone 104 uses the IP address received from the registry server 118 to establish a connection with the target device over the Internet 106. This connection may be used by the mobile telephone 104 to access the user's personal files on the target device.

In addition to retrieving files from target devices, the mobile telephone 104 may also be used to manage the user's infosphere 108, including the function of deleting devices. This may be achieved by launching a software application (or by performing some other enabling function). A list of devices in the user's infosphere 108 is then presented to a display on the mobile telephone 104. Using the keypad, the user locks a cursor on a target device listed on the display and then hits the delete key. The mobile telephone 104 then retrieves the network address for the target device from internal memory, establishes an Internet connection over the wireless network 102, and sends the network address, along with the delete request, to the registry server 118. In response to this request, the registry server 118 deletes the network address for the target device from its the database 120 and sends an acknowledgment back to the mobile telephone 104 indicating that the deletion operation was successful.

Figure 2:
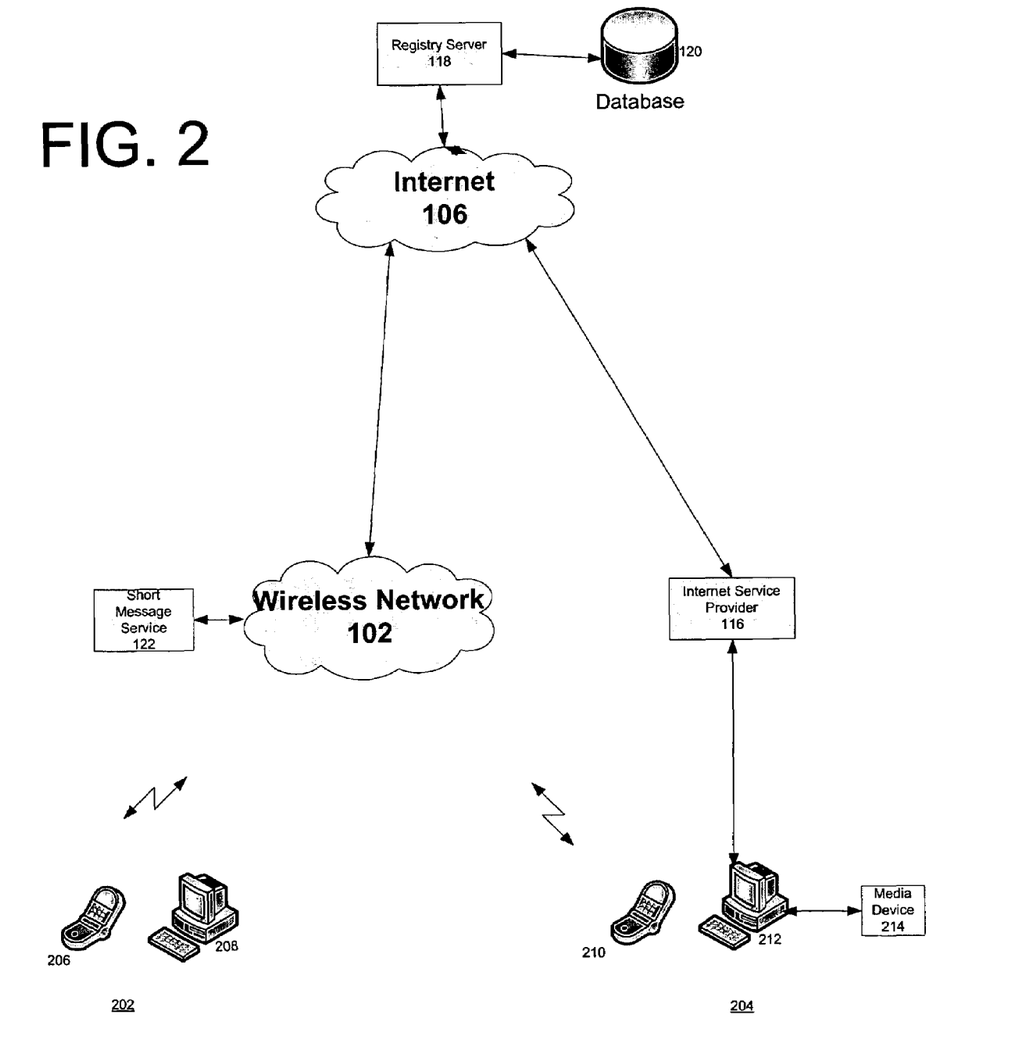
FIG. 2 is a conceptual diagram of a telecommunications system supporting multiple user infospheres.

In at least one embodiment of the telecommunications system 100, a user can give another user access to his or her infosphere. An example of this concept will be described with reference to FIG. 2. FIG. 2 is a conceptual diagram of a telecommunications system 100 illustrating a first user's infosphere 202 and a second user's infosphere 204. The first user's infosphere 202 includes a mobile telephone 206 and a computer 208. The first user's mobile telephone number is "555-1234" and the network address for his computer is "5551234.pc." The second user's infosphere 204 includes a mobile telephone 210, a computer 212, and a media device 214 connected to the computer 212. The mobile telephone number of the second user is "555-5678," and the network addresses for his computer and media device are "555-5678.pc" and "555-5678.md," respectively.

In this example, the second user has programmed his or her computer 212 to grant the first user access to various music files on the second user's media device 214. The first user can access the second user's music files by launching a software application on his or her mobile telephone 206 (or by some other enabling means), and then entering the network address of the second user's media device 214 along with an access request. In this example, the first user enters "5555678.md" into his or her mobile telephone 206. The mobile telephone 206 then establishes an Internet connection over the wireless network 102 and sends the network address of the second user's media device 214 to the registry server 118. The registry server 118 uses the network address to locate in its database 120 the corresponding IP address and sends that IP address over the Internet 106 back to the first user's mobile telephone 206. In the embodiment shown in FIG. 2, the second user's computer 212 is the network node for the media device 214, and therefore, the IP address sent back to the mobile telephone 206 is the IP address for the second user's computer 212. The first user's mobile telephone 206 uses the IP address to establish a connection with the second user's computer 212 over the Internet 106.

The connection may be used by the first user on his or her mobile telephone 206 to access the second user's media device 214. More specifically, a request is sent from the first user's mobile telephone 206 to the second user's computer 212. The second user's computer 212 receives the request and searches its database to determine whether it has granted the first user access to the media device 214. Following the search, the second user's computer 212 sends a message back to the first user's mobile telephone 206 indicating whether access has been granted or denied. Assuming that access has been granted, various higher layer software applications on both devices can work together to allow the first user on the mobile telephone 206 to view and download music files from the second user's media device 214.

Figure 3:
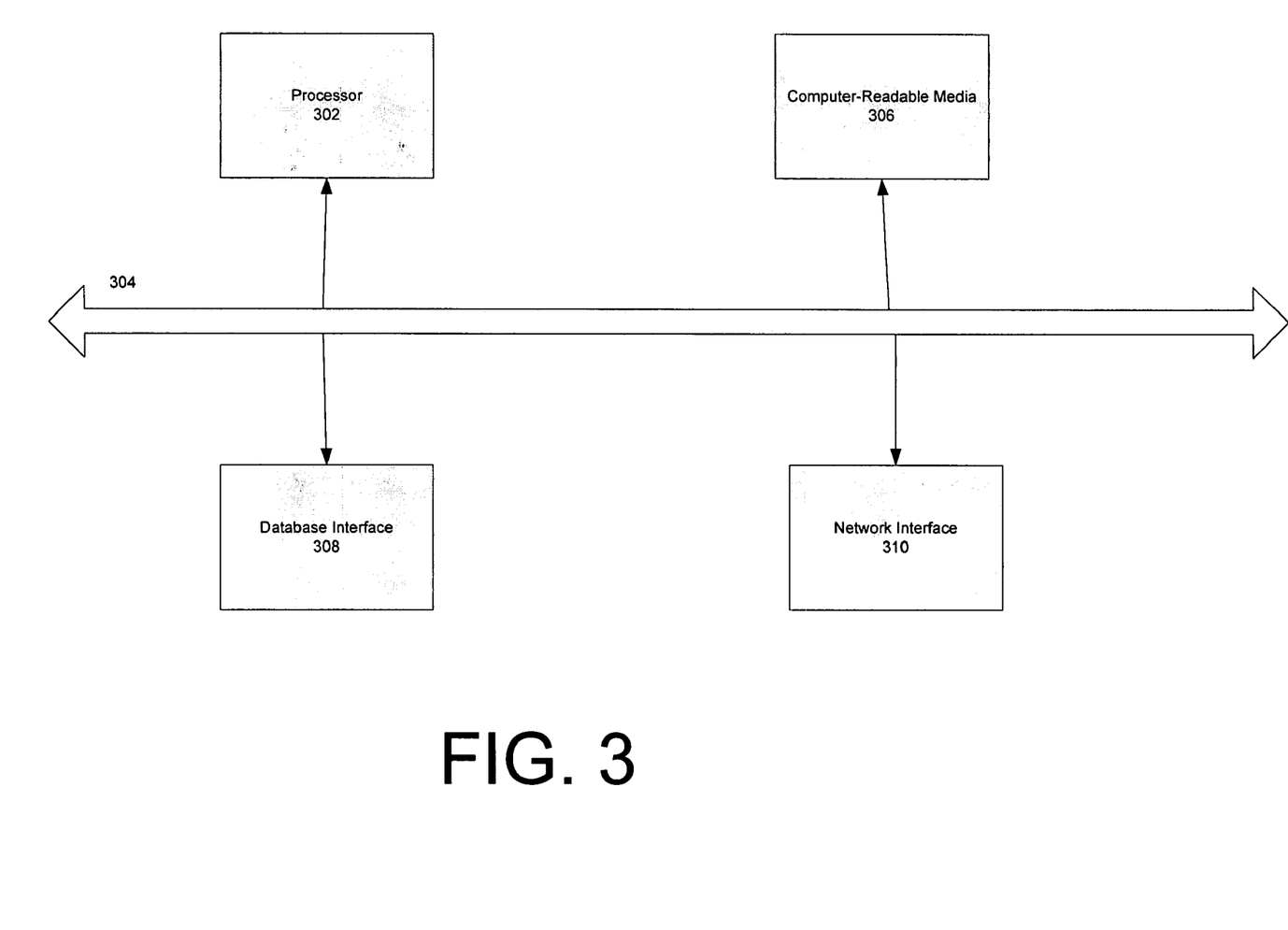
FIG. 3 is a block diagram of a registry server in the telecommunication systems of FIGS. 1 and 2.

FIG. 3 is a simplified block diagram illustrating the functionality of the registry server. In at least one embodiment, the registry server 118 includes at least one processor 302 which communicates with a number of peripheral devices via a system bus 304. The processor 302 may be implemented in hardware, software, firmware, or any combination thereof. Typically, the processor 302 will be implemented with a microprocessor that supports various software applications. These software applications provide a number of functions including authorizing requests to add or delete devices from a user's infosphere, creating network address for those devices added to the user's infosphere, and mapping these network address to the IP address of the devices.

The peripheral devices may include computer-readable media 306 comprising, by way of example, volatile and non-volatile memory. The volatile memory may be Dynamic Random Access Memory (DRAM), Static Random Access Memory (SRAM), or any other suitable high speed memory device. The non-volatile memory may include a magnetic hard drive, an optical disk, and/or any other form of storage for large amounts of data and software applications. Software applications and data from non-volatile memory may be written to volatile memory to increase the speed of memory access by the processor 302. Those skilled in the art will recognize that the term "computer-readable media" includes any type of storage device(s) that are accessible by the processor 302 and also encompasses a carrier wave that encodes a data signal.

The peripheral devices may also include various interfaces including a network interface 308 to the database 120 (see FIG. 1). As indicated earlier, the database stores the mapping information between the network addresses and IP addresses for various user infospheres. The database may be external to the registry server 118 with a wireless or wire-line T1 or T3 link, fiber optic connection, Ethernet, or other IP connection. Alternatively, the database may be fully or partially integrated into the registry server 118, either on the hard drive or some other suitable non-volatile memory. A network interface or modem 310 may be used provide protocol translation to support communications between the registry server 118 and the Internet.

Figure 4:
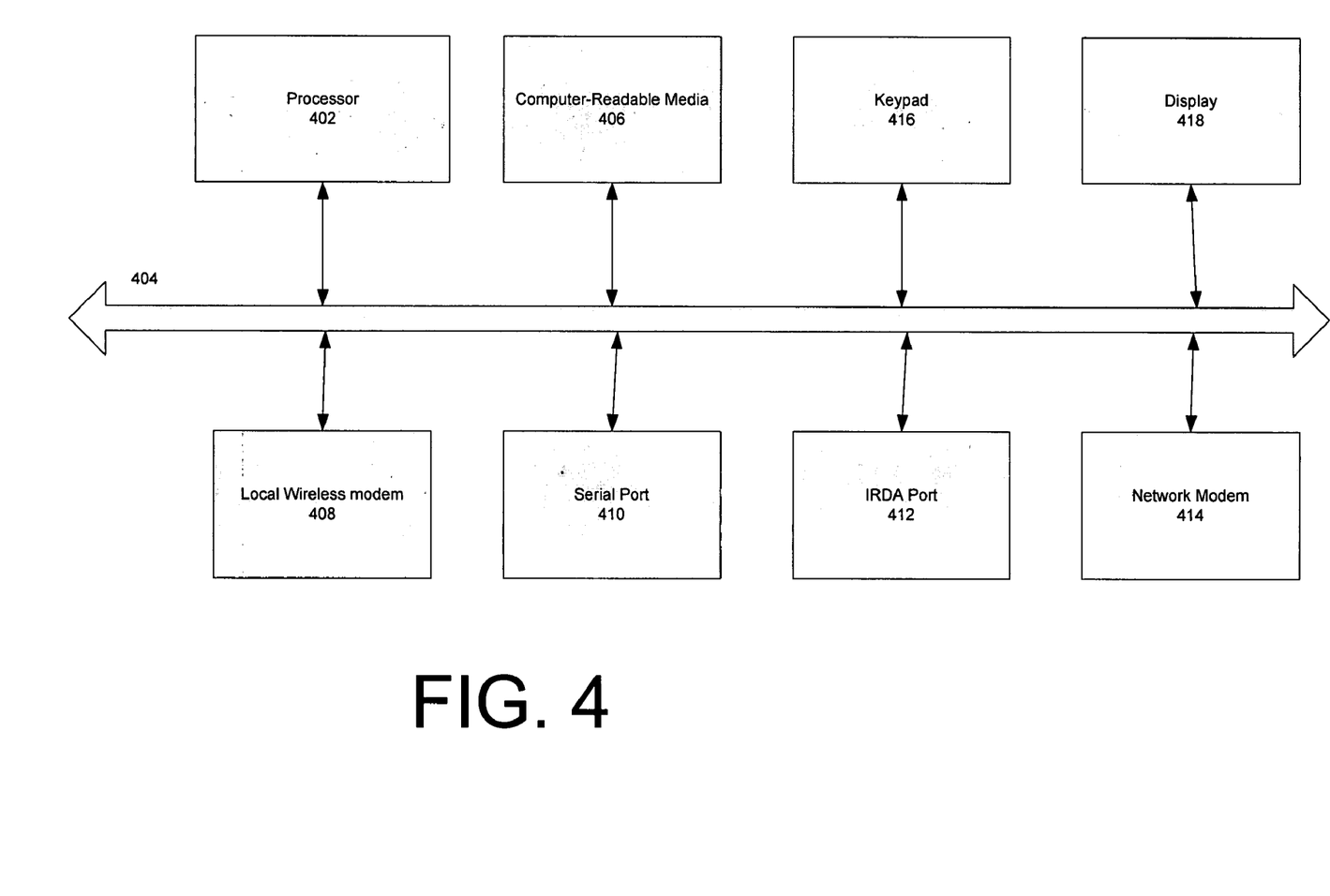
FIG. 4 is a block diagram of a computer in the telecommunication systems of FIGS. 1 and 2.

FIG. 4 is a simplified block diagram illustrating the functionality of the computer 110. In at least one embodiment, the computer 110 includes at least one processor 402 which communicates with a number of peripheral devices via a system bus 404. The processor 402 will typically be implemented with a microprocessor supporting various software applications, but may be implemented in hardware, software, firmware, or any combination thereof. The software applications provide various functions that, among other things, allow the computer to join the user's infosphere and support the downloading of files to the user's mobile telephone 104 (see FIG. 1). The software applications may reside in computer-readable media 406 attached to the system bus 404, or anywhere else internal or external to the computer 110. The computer-readable media 406 may include volatile and non-volatile memory similar to that described in connection with the registry server 118 (see FIG. 2).

The peripheral devices may include several different types of physical interfaces. These physical interfaces may include a local wireless modem 408, serial port 410, and IRDA port 412, but as those skilled in the art will readily appreciate, any combination of these physical interfaces and a variety of other physical interfaces may be implemented in the computer 110. External devices, such as the game console 112 and media device 114 shown in FIG. 1, may use these physical interfaces to connect to the Internet. By way of example, the game console 112 (see FIG. 1) may connect to the computer 110 through a cable to the serial port 410 and the media device 114 (see FIG. 1) may connect to the computer 110 through the local wireless modem 408 using Bluetooth, UWB, or any other suitable wireless technology. The serial port 410 could be RS-232, a Universal Serial Bus (USB), or any other communication interface requiring a physical cable between the computer 110 and another device. The IRDA port 412 uses infrared techniques that are well known in the art, but could also be any other suitable light-based wireless communication interface.

The peripheral devices may also include a network modem 414 to support the physical interface between the computer 110 and the ISP 116 (see FIG. 1). In one embodiment of the computer 110, the network modem 414 is capable of driving a standard twisted pair telephone line. Alternatively, the network modem 414 may be a DSL modem, cable modem, or any other modem suitable to support the physical interface between the computer 110 and the ISP 116.

The remaining peripheral devices shown in FIG. 4 include a keypad 416 and a display 418. These devices allow a user of the computer to perform various tasks such as joining the user's infosphere, and controlling access to computer files on the computer-readable media 406 and on external devices connected to the computer 110 through the physical interfaces 408, 410, 412. In at least one embodiment, the user manipulates the keypad 416 to launch an application from the computer-readable media 406. The application is loaded into the processor 402 and executed. The execution of the application by the processor 402 results in a presentation to the display 418 that prompts the user to enter his or her mobile telephone number using the keypad 416. At the same time, or thereabouts, the processor 402 connects to Internet over the physical layer interface established by the network modem 414. Once connected to the Internet, the processor can establish communications with any accessible Internet node including the registry server 118 (see FIG. 1) and the user's mobile telephone 104 (see FIG. 1).

Figure 5:
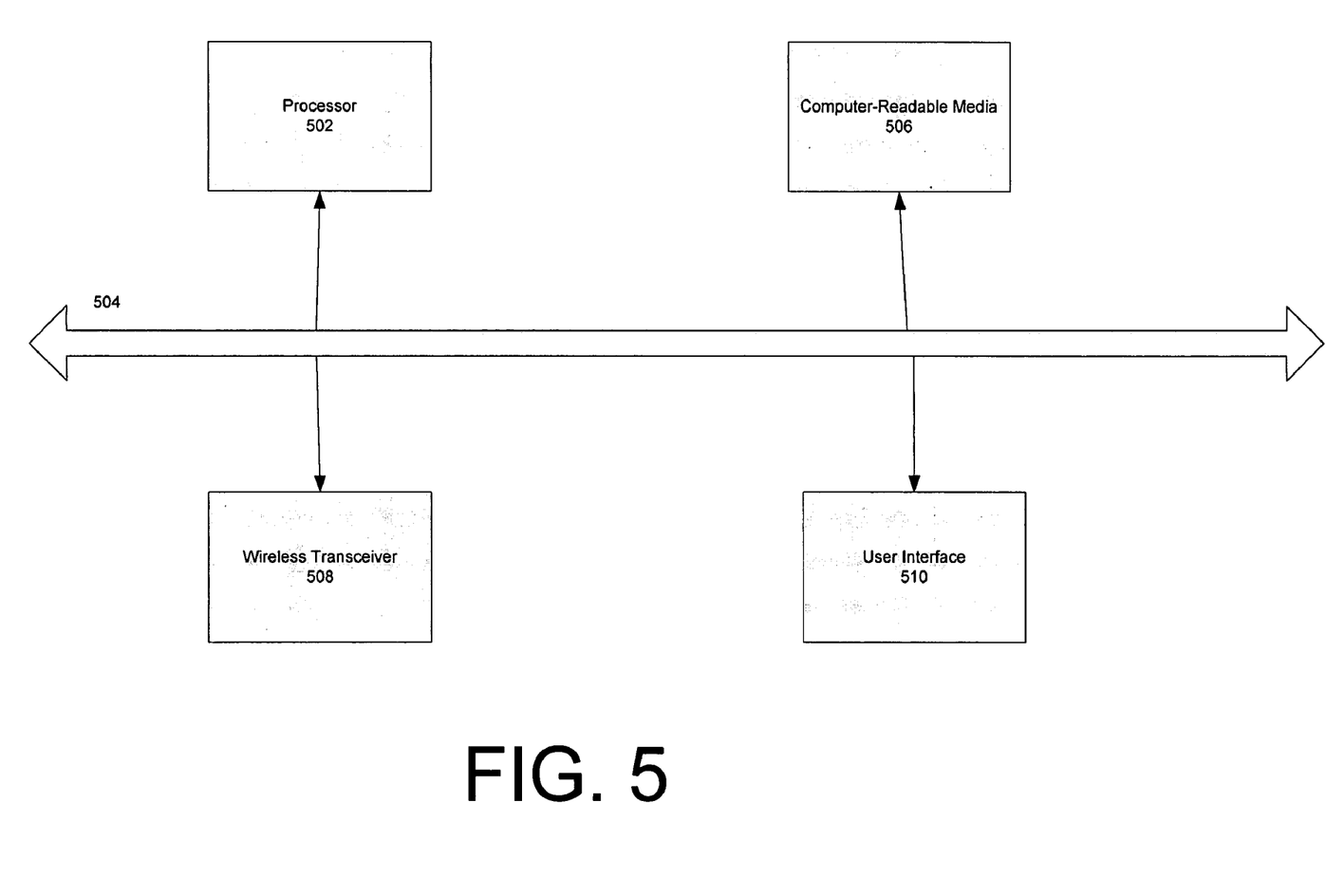
FIG. 5 is a block diagram of a mobile telephone in the telecommunication systems of FIGS. 1 and 2.

FIG. 5 is a simplified block diagram illustrating the functionality of the mobile telephone 104. In at least one embodiment, the mobile telephone 104 is configured in much the same way as the computer described in connection with FIG. 4. That is, a processor 502, or multiple processors, communicates with a number of peripheral devices over a system bus 504. These peripheral devices includes computer-readable media 506 to store software applications and data, a wireless transceiver 508 to support a physical layer connection with an access point in the wireless network 102 (see FIG. 1), and a user interface 510 to allow a user to control the operation of the mobile telephone 104. The user interface 510 may include a series of keys, a keypad, a display, and/or other user interface devices.

The user interface 510 may be used to launch various applications that, among other things, allow the user to remotely control and manage the Internet devices in his or her infosphere. In some embodiments of the mobile telephone 104, these applications may also allow the user to access Internet devices in other user's infospheres. In at least one embodiment, the user employs the user interface 510 to launch an application from the computer-readable media 506 and load it into the processor 502. The execution of the application by the processor 502 results in an Internet connection over the physical layer interface established by the wireless transceiver 508. Once connected to the Internet, the processor 502 can establish communications with any accessible Internet node including the registry server 118 (see FIG. 1) and the various Internet devices in his or her infosphere.

The manner in which the registry server 118, computer 110, mobile telephone 104, and other telecommunication devices are implemented in practice will vary depending on the particular application and the design constraints imposed on the overall system. Those skilled in the art will recognize the interchangeability of hardware, firmware, and software configurations under these circumstances, and how best to implement the described functionality for each particular application.

Figure 6:
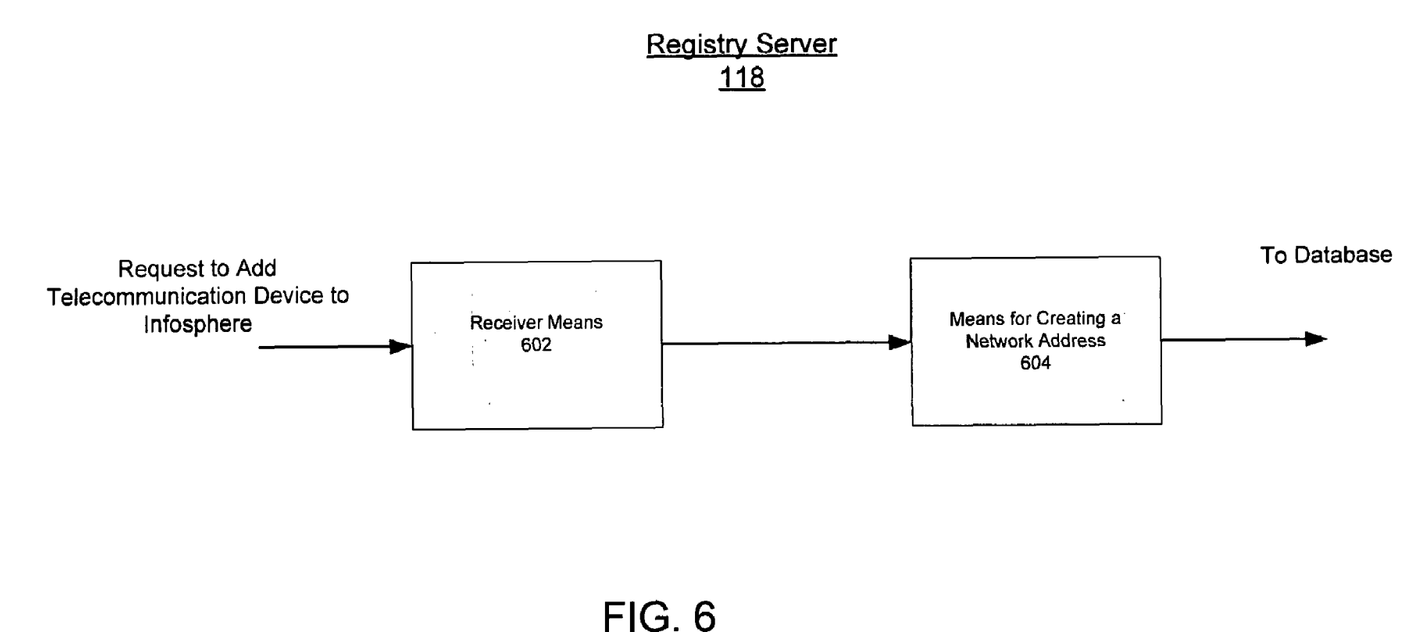
FIG. 6 is a block diagram of an alternative embodiment of a registry server in the telecommunication systems of FIGS. 1 and 2.

FIG. 6 is a block diagram of an alternative embodiment of a registry server. The registry server 118 includes a receiving means 602 for receiving a request from a telecommunications device to add the telecommunications device to an infosphere having a mobile telephone. The registry server also includes a means for creating a network address for the telecommunications device, the network address being related to the telephone number of the mobile telephone.

Figure 7:
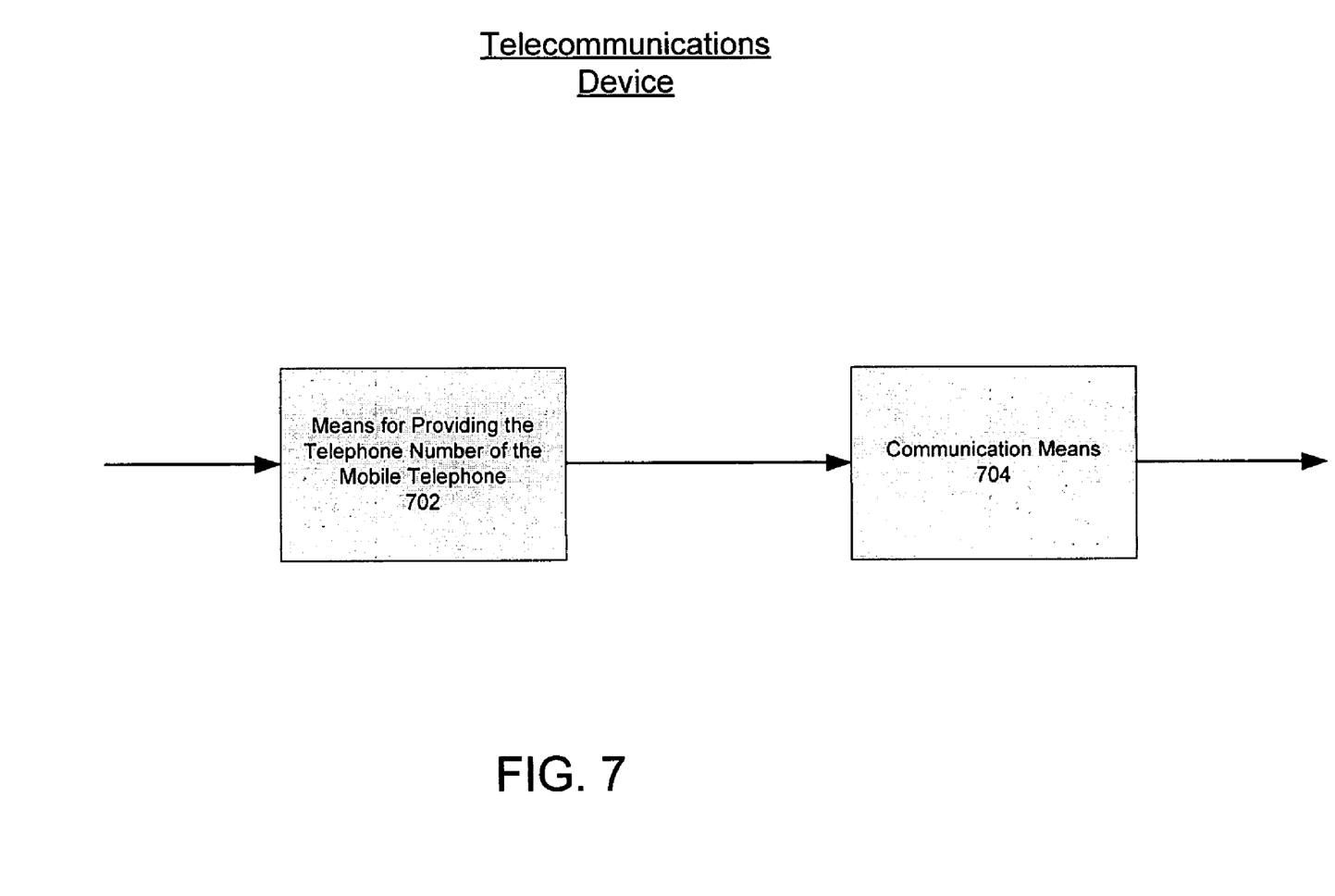
FIG. 7 is a block diagram of an alternative embodiment of a computer in the telecommunication systems of FIGS. 1 and 2.

FIG. 7 is a block diagram of an alternative embodiment of a telecommunications device, such as the computer 110 of FIG. 4. The telecommunications device includes a means for providing to the registry server the telephone number of the mobile telephone 702, and communication means for communicating with the registry server to add the telecommunications device to an infosphere having the mobile telephone.

Figure 8:
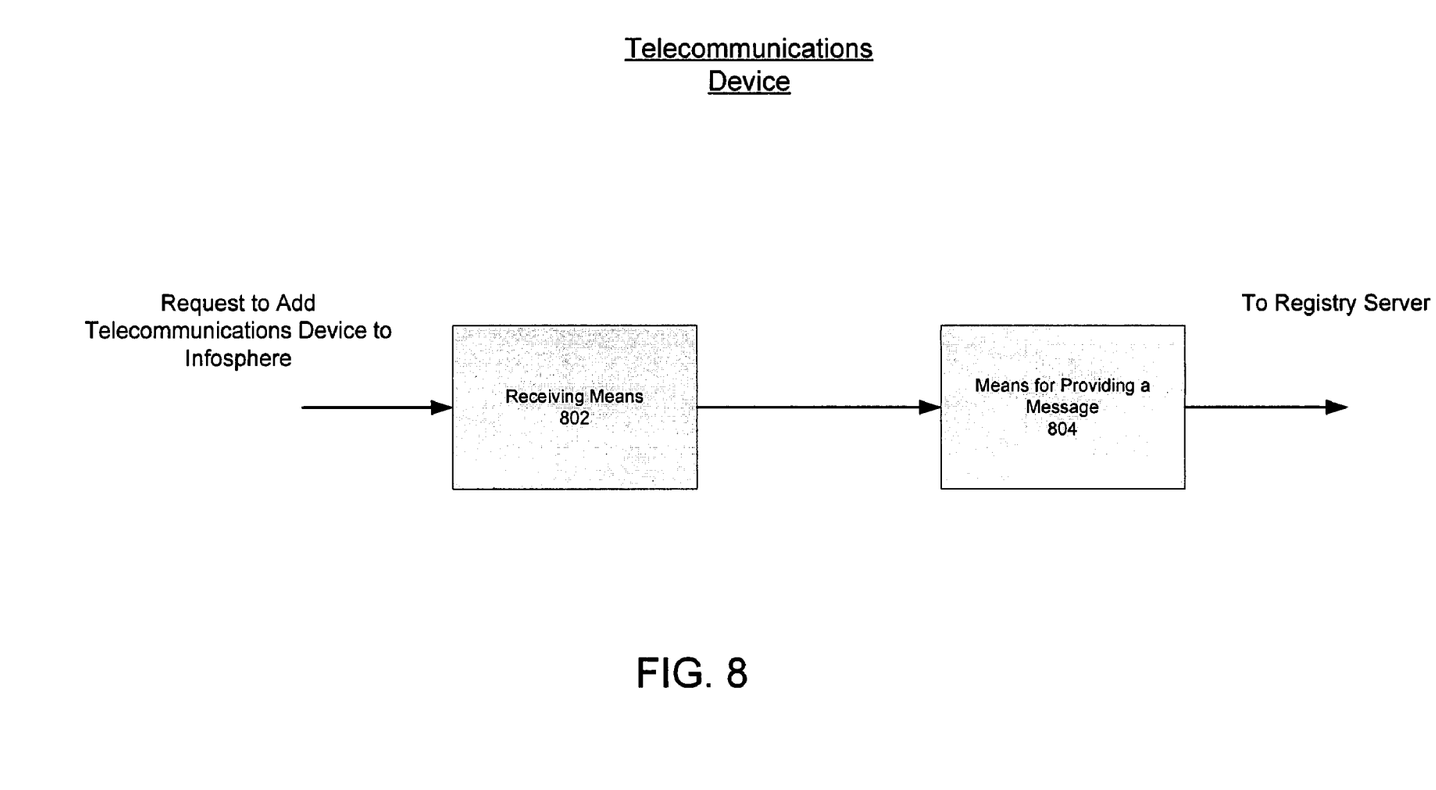
FIG. 8 is a block diagram of an alternative embodiment of a mobile telephone in the telecommunication systems of FIGS. 1 and 2.

FIG. 8 is a block diagram of an alternative embodiment of a telecommunications device, such as the mobile telephone of FIG. 5. The telecommunications device may be configured to remotely control an infosphere having a mobile telephone. The telecommunications device includes a receiver 802 for receiving a request from a registry server to add a second telecommunications device to the infosphere, and a message provider 804 means for providing to the registry server a message either authorizing or rejecting the request.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A registry server, comprising:
a communications interface; and
a processor configured to receive, via the communications interface, a request from a telecommunications device to add the telecommunications device to an infosphere, and in response to the request, add the telecommunications device to the infosphere by creating a network address for the telecommunications device,
wherein the telecommunications device has a mobile telephone associated with the telecommunications device, and
wherein the network address is created based on the telephone number of the associated mobile telephone.

2. The registry server of claim 1 wherein the network address comprises the telephone number of the mobile telephone and information identifying the telecommunications device.

3. The registry server of claim 2 wherein the information identifying the telecommunications device is appended to the end of the telephone number of the mobile telephone.

4. The registry server of claim 1 wherein the processor is further configured to map the network address of the telecommunications device to the IP address of the telecommunications device.

5. The registry server of claim 4 wherein the processor is further configured to receive the network address from a second telecommunications device attempting to access the telecommunications device in the infosphere, and provide to the second telecommunications device, in response to receiving the network address, the IP address of the telecommunications device in the infosphere.

6. The registry server of claim 5 wherein the second telecommunications device is part of the infosphere.

7. The registry server of claim 6 wherein the second telecommunications device comprises the mobile telephone.

8. The registry server of claim 5 wherein the second telecommunications device comprises a telecommunications device outside the infosphere.

9. The registry server of claim 1 wherein the processor is further configured to communicate with the mobile telephone to obtain authorization for adding the telecommunications device to the infosphere.

10. The registry server of claim 9 wherein the processor is further configured to communicate with the mobile telephone through a short message service (SMS).

11. A telecommunications device, comprising:
a communications interface; and
a processor configured to communicate, via the communications interface, with a registry server to add the telecommunications device to an infosphere having a mobile telephone by providing to the registry server the telephone number of the mobile telephone,
wherein, when the telecommunications device is added to the infosphere, a network address for the telecommunications device is created based on the telephone number of the mobile telephone.

12. The telecommunications device of claim 11 further comprising a user interface, and wherein the processor is configured to communicate with the registry server to add the telecommunications device to the infosphere in response to one or more inputs from the user interface.

13. The telecommunications device of claim 12 wherein the one or more inputs from the user interface includes the telephone number of the mobile telephone.

14. The telecommunications device of claim 11 further comprising a user interface, and wherein the processor includes one or more software applications that communicate with the registry server to add the telecommunications device to the infosphere, the one or more software applications being launched in response to one or more inputs from the user interface.

15. The telecommunications device of claim 11 further comprising a display, and wherein the processor is further configured to create a prompt on the display to enter the telephone number of the mobile telephone using the user interface.

16. A telecommunications device configured to remotely control an infosphere having a mobile telephone, comprising:
a transceiver; and
a processor configured to receive, via the transceiver, a request from a registry server to add a second telecommunications device to the infosphere, and provide to the registry server a message either authorizing or rejecting the request,
wherein if the request is authorized, a network address for the second telecommunications device is created based on the telephone number of the mobile telephone.

17. The telecommunications device of claim 16 wherein the telecommunications device comprises a mobile telephone.

18. The telecommunications device of claim 16 further comprising one or more keys, and wherein the processor is further configured to create the message, either authorizing or rejecting the request, in response to one or more inputs from the one or more keys.

19. The telecommunications device of claim 16 further comprising one or more keys, and a display, wherein the processor is further configured to create a prompt on the display to enter a response to the registry server request using the one or more keys, the response being used by the processor to create the message either authorizing or rejecting the request.

20. A method of maintaining an infosphere, comprising:
receiving, at a registry server, a request from a telecommunications device to add the telecommunications device to the infosphere; and
adding, in response to the request, the telecommunications device to the infosphere by creating, at the registry server, a network address for the telecommunications device,
wherein the telecommunications device has a mobile telephone associated with the telecommunications device, and
wherein the network address is created based on the telephone number of the associated mobile telephone.

21. The method of claim 20 wherein the network address is created from the telephone number of the mobile telephone and information identifying the telecommunications device.

22. The method of claim 21 wherein the network address is created by appending the information identifying the telecommunications device to the end of the mobile telephone number.

23. The method of claim 20 further comprising mapping, at the registry server, the network address of the telecommunications device to the IP address of the telecommunications device.

24. The method of claim 23 further comprising receiving, at the registry server, the network address from a second telecommunications device attempting to access the telecommunications device in the infosphere, and providing to the second telecommunications device, in response to the network address, the IP address of the telecommunications device in the infosphere.

25. The method of claim 24 wherein the second telecommunications device is part of the infosphere.

26. The method of claim 25 wherein the telecommunications device comprises the mobile telephone.

27. The method of claim 24 wherein the second telecommunications device is outside the infosphere.

28. The method of claim 20 further comprising receiving, at the registry server, authorization from a second telecommunications device for adding the telecommunications device to the infosphere.

29. The method of claim 28 wherein the registry server receives authorization to add the telecommunications device to the infosphere by using a short message service (SMS).

30. A computer-readable media containing instructions for a processor, the instructions comprising:
a routine configured to receive, at a registry server, a request from a telecommunications device to add the telecommunications device to an infosphere; and
a routine configured to add, in response to the request, the telecommunications device to the infosphere by creating, at the registry server, a network address for the telecommunications device,
wherein the telecommunications device has a mobile telephone associated with the telecommunications device, and
wherein the network address is created based on the telephone number of the associated mobile telephone.

31. A registry server, comprising:
means for receiving a request from a telecommunications device to add the telecommunications device to an infosphere; and means for adding the telecommunications device to the infosphere, in response to the request, by creating a network address for the telecommunications device, wherein the telecommunications device has a mobile telephone associated with the telecommunications device, and wherein the network address is created based on the telephone number of the associated mobile telephone.

32. A telecommunications device, comprising:

means for providing to the registry server the telephone number of a mobile telephone; and means for communicating with a registry server to add the telecommunications device to an infosphere having the mobile telephone, wherein, when the telecommunications device is added to the infosphere, a network address for the telecommunications device is created based on the telephone number of the mobile telephone.

33. A telecommunications device configured to remotely control an infosphere having a mobile telephone, comprising:

means for receiving a request from a registry server to add a second telecommunications device to the infosphere; and means for providing to the registry server a message either authorizing or rejecting the request, wherein if the request is authorized, a network address for the second telecommunications device is created based on the telephone number of the mobile telephone.

34. A method of maintaining an infosphere having a mobile telephone, comprising:

providing, to a registry server, a telephone number of the mobile telephone; and communicating, with the registry server, to add a telecommunications device to the infosphere, wherein, when the telecommunications device is added to the infosphere, a network address for the telecommunications device is created based on the telephone number of the mobile telephone.

35. A computer-readable medium encoded with instructions executable to perform a method comprising:

providing, to a registry server, a telephone number of a mobile telephone; and communicating, with a registry server, to add a telecommunications device to an infosphere having the mobile telephone, wherein, when the telecommunications device is added to the infosphere, a network address for the telecommunications device is created based on the telephone number of the mobile telephone.

36. A method of maintaining an infosphere having a mobile telephone, comprising:

receiving, from a registry server, a request to add a telecommunications device to the infosphere; and providing, to the registry server, a message either authorizing or rejecting the request, wherein if the request is authorized, a network address for the second telecommunications device is created based on the telephone number of the mobile telephone.

37. A computer-readable medium encoded with instructions executable to perform a method comprising:

receiving, from a registry server, a request to add a second telecommunications device to the infosphere; and providing, to the registry server, a message either authorizing or rejecting the request, wherein if the request is authorized, a network address for the second telecommunications device is created based on the telephone number of the mobile telephone.

* * * * *

UNITED STATES PATENT AND TRADEMARK OFFICE
CERTIFICATE OF CORRECTION

PATENT NO. : 7,684,797 B2
APPLICATION NO. : 11/343381
DATED : March 23, 2010
INVENTOR(S) : Jain et al.

It is certified that error appears in the above-identified patent and that said Letters Patent is hereby corrected as shown below:

Column 11, line 57, claim 17: "a mobile telephone" to read as --the mobile telephone--

Column 14, line 28, claim 37: "the infosphere" to read as --an infosphere--

Column 14, line 33, claim 37: "the mobile telephone" to read as --a mobile telephone--

Signed and Sealed this
Twelfth Day of July, 2011

David J. Kappos
*Director of the United States Patent and Trademark Office*